Patented May 31, 1927.

1,631,017

UNITED STATES PATENT OFFICE.

STUART L. CRAWFORD, OF ROCHESTER, NEW YORK.

PROCESS FOR PRESERVING OR CANNING FRUIT.

No Drawing.     Application filed September 10, 1926. Serial No. 134,753.

The object of this invention is to provide a new process for preserving or canning apples and other fruits, in order that they may thereafter be used for the purpose of making pies, and other similar purposes in cooking, and when so used will be of good appearance and will retain a large proportion of the original natural flavor.

Another object of the invention is to remove the air from the cellular tissue of the fruit, thus obviating the necessity of vacuumizing the fruit before being placed in the can, it being well known that if any appreciable amount of oxygen remains in the can after sealing that both a chemical and electrolytical reaction will take place due to the presence of oxygen, resulting in the can being attacked and ultimately perforated or pinholed, allowing access of air, with consequent spoilage of the contents, or discoloration of the fruit.

Another object of this invention is to replace the air removed from the cellular tissue of the fruit with sugar syrup, in order that after processing and cooling of the cans there will be little shrinkage of the contents, as is usually the case when the air has not first been removed from the cells of the fruit before the sealing of the cans. By decreasing the percentage of shrinkage the available air space at the top of the can is reduced and thus the vacuum increased.

Another object of this invention is to preheat the fruit to a high degree of temperature before being filled into the cans, which high temperature will not only reduce the loss from fermentation and spoilage but will also serve to increase the vacuum in the top of the can after sealing and cooling.

Another object of this invention is, by means of a short cook at high temperatures, to soften the cell walls of the fruit to the proper point to allow as much fruit to be placed in the can as possible and thus increase the drained weight.

Another object of this invention is to preserve the fruit in a syrup in order that the entire contents of the can may be used for making pies and other food products, whereas under the present practice it is usual to discard or drain off the watery juice in the cans, thus wasting the original flavor of the fruit contained in the water drained off.

In the practice of my invention the apples are first peeled and cored, or they may be simply peeled, and cored later at the time of trimming. The apples are then conveyed from the peeling machines to a tank containing approximately a 5 per cent cold water salt solution to prevent discoloration, the apples remaining in this salt solution for as long a time as may be desired. Or, the apples may be peeled and cored, then taken directly to the seed-cellars and quartered or otherwise subdivided, and may then be conveyed directly to the salt solution, after which they may be finally trimmed.

After the apples are trimmed they are then placed in open meshwork wire baskets, water is run or sprayed over them to remove the excess of salt, and they are then directly immersed in a sugar solution having a boiling point of 215 degrees F. to 240 degrees F. In any case the liquid will be at the boiling point. The more sugar that is desired in the final product the more sugar will be added to the syrup and therefore the higher will be the boiling point of the syrup in which the fruit is treated. In other words, the concentration of the sugar solution will depend upon the amount of sugar desired in the final product.

This step in the process forces the air from the cellular tissue of the fruit and the air is replaced by the cane sugar syrup which is thus absorbed in the tissue. Glucose or other sugars may be used as a substitute for cane sugar in this step if so desired.

The apples or other fruit are immersed in the boiling sugar solution from one to five minutes, depending upon the type and quality of fruit used and are then removed and filled directly into cans, which are promptly sealed, and under ordinary conditions will remain free from fermentation without further treatment. As a further precaution, however, Pasteurization may be used after the cans have been sealed up, but this is not believed to be necessary in all cases.

Due to the high concentration of sugar syrup and the short time of cooking and inasmuch as the fruit is cooked in practically its own juice, the natural flavor is retained to a marked degree. The high temperature of cooking promptly kills any foreign ferments or molds present.

The can is filled with syrup or boiling water, in order to exclude air at the top of the can, and the can is then filled. This process removes practically all air from the pores and cells of the fruit, replacing it with syrup or liquid, in which case the syrup or liquid is not thereafter absorbed in the fruit. It has been found by experience that cans filled in this manner will have practically the same amount of free syrup or liquid when opened after standing for many months as when originally sealed, whereas it usually happens in present canning practices that a considerable quantity of the water or syrup is absorbed in the fruit, replacing the air originally present, which air collects on top of the liquid after the can has been sealed up, thus increasing the air space at the top of the container, resulting in the rapid corrosion and pin-holing of the can.

It will also be understood that spices such as cinnamon, nutmeg, etc. may be added to the sugar solution. The flavor of the spices will thus be added to the flavor of the pie, etc.

I claim:

1. The process of preserving fruit which consists of removing the waste matter, immersing the fruit in a salt solution of about 5%, thereafter washing off the excess of salt and thereafter immersing the fruit from 1 to 5 minutes in a sugar solution having a boiling point of from 215 degrees to 240 degrees F., whereby the air is replaced by the cane syrup which is thus absorbed in the tissue, after which the fruit is filled into a can to exclude the air and sealed.

2. The process of preparing fruit for preserving which comprises in immersing the fruit from 1 to 5 minutes in a sugar solution having a boiling point of from 215 degrees to 240 degrees F., whereby the air is replaced by the cane syrup which is thus absorbed in the tissue after which the fruit is filled into a can to exclude the air and sealed.

3. The process of preparing fruit for preserving which comprises immersing the fruit from 1 to 5 minutes in a sugar solution having a boiling point of from 215 degrees to 240 degrees F., said treatment being adapted to remove the air from the fruit and fill up the cells with sugar solution, whereby the air is replaced by the cane syrup which is thus absorbed in the tissue.

In testimony whereof I affix my signature.

STUART L. CRAWFORD.